Figure 1:
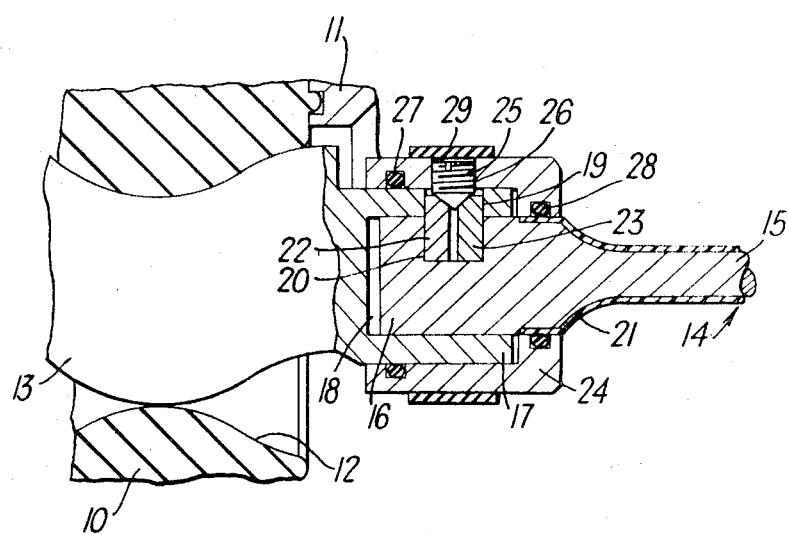

United States Patent

[11] 3,600,113

[72] Inventors Hans Gunther Pahl
 Brentwood;
 Stanley George Woods, London, both of, England
[21] Appl. No. 867,666
[22] Filed Oct. 20, 1969
[45] Patented Aug. 17, 1971
[73] Assignee Mono Pumps Limited
 London, England

[54] ROTARY PUMP OR MOTOR WITH AN AXIALLY ROTATING ROTOR
 8 Claims, 2 Drawing Figs.
[52] U.S. Cl. .................................................. 418/48
[51] Int. Cl. .................................................. F01c 1/10, F01c 5/00
[50] Field of Search .......................................... 418/48

[56] References Cited
 UNITED STATES PATENTS
2,915,979  12/1959  Bourke et al. ................. 418/48
3,097,609  7/1963  Nechine ........................ 418/48
 FOREIGN PATENTS
1,171,748  6/1964  Germany ...................... 418/48

Primary Examiner—Carlton R. Croyle
Assistant Examiner—Wilbur J. Goodlin
Attorney—Cushman, Darby and Cushman ABSTRACT: A rotary pump or motor, e.g. a helical gear pump, comprising a stator having a rotor eccentrically rotatable with respect thereto, a flexible drive shaft having an end portion located in a recess in the rotor, key means located in transversely aligned apertures formed in the recess and the end portion of the shaft, to key the drive shaft to the rotor, to drive the rotor or receive drive therefrom, the flexible drive shaft being coated with a nonpermeable and nonporous layer.

PATENTED AUG 17 1971

3,600,113

SHEET 2 OF 2

Inventors
HANS GUNTHER PAHL
STANLEY GEORGE WOODS
By
Cushman Darby & Cushman
Attorneys

ROTARY PUMP OR MOTOR WITH AN AXIALLY ROTATING ROTOR

The present invention relates to a rotary pump or motor with an eccentrically rotating rotor. One particular form of such pump is a helical gear pump which includes a stator provided with one or more internal helical gears or teeth, and a rotor provided with one or more external helical gears or teeth, meshing with those of the stator, the number of starts of the gear or gears of one member being one more than that of the other member. With such pumps, the rotor executes a rotary motion, and also orbits in either the same sense or the opposite sense as the rotary motion. Other forms of such pumps or motor are those of the "Wankel" type in which the rotor again executes a rotary action and an orbiting motion.

In the helical gear pump, the rotor is conventionally connected to a drive motor by an intermediate drive shaft, provided at each end with a universal joint, the universal joints accommodating both the rotary and the orbiting motion. Since these pumps are often used to pump corrosive liquids or powders, the universal joint, particularly at the rotor end of the drive shaft, is subject to considerable wear and leaching of the joint lubricant.

According to the present invention there is provided a rotary pump or motor comprising a stator having a rotor eccentrically rotatable with respect thereto, a flexible drive shaft having an end portion located in a recess in the rotor, key means located in transversely aligned apertures formed in the recess and the end portion of the shaft, to key the drive shaft to the rotor, to drive the rotor or receive drive therefrom, the flexible drive shaft being coated with a nonpermeable and nonporous layer.

The invention also provides a rotary helical gear pump comprising a stator formed with at least one helical gear, a rotor formed with at least one helical gear meshing with the stator gear or gears, the number of starts of the gear or gears of the stator differing by one from the number of starts of the gear or gears of the rotor, a flexible drive shaft having an end portion located in a recess in the rotor, key means located in transversely aligned apertures formed in the recess and the end portion of the shaft to key the drive shaft to the rotor, to drive the rotor or receive drive therefrom, the flexible drive shaft being coated with a nonpermeable and nonporous layer.

It will be appreciated that the flexible shaft will be subject to a substantial cyclic stress variation. By providing the coating of nonpermeable and nonporous material, the effect of corrosion fatigue is eliminated, the shaft itself being only likely to fail under normal fatigue conditions.

While a few stainless steels have a high resistance to fatigue in the presence of corrosive or reactive media such as atmospheric air containing moisture or water, these stainless materials are extremely costly and, in any event, are not entirely free from fatigue. By providing a coating of nonpermeable and nonporous material, it is possible to use a steel of moderate strength which is comparatively cheap and readily obtainable.

Suitable coating materials include a plastics material known under the trade name "Penton," which is a chlorinated polyether, which is preferred, nitral rubber and certain epoxy resins. A thin coating of gold also provides good results from a corrosion fatigue point of view, but its relative softness makes it liable to abrasion in certain uses of a pump. "Penton" can be applied to the flexible shaft using a fluidized bed technique while certain epoxy resins have the advantage that they can simply be painted on. Generally, it is not possible to plate a coating onto the shaft, since such a process tends to induce certain tensile stresses in the shaft, which can affect the latters fatigue resistance.

The use of the keying arrangement between the drive shaft and rotor enables operation readily to be effected in either rotational direction.

Figure 2:
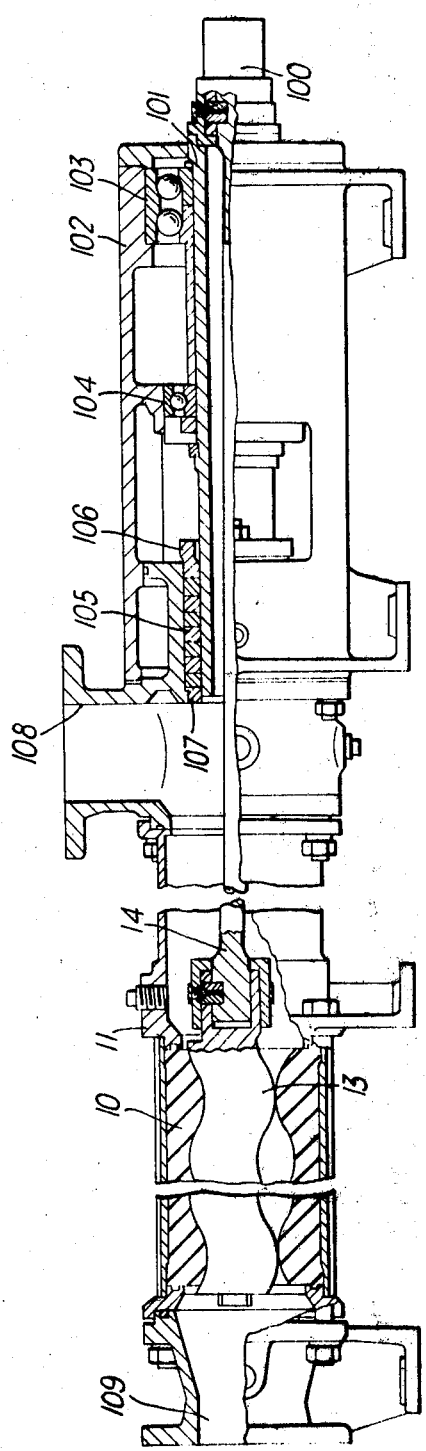

In order that the invention may more readily be understood, the following description is given, merely by way of example, reference being made to the accompanying drawings, in which:

FIG. 1 is a fragmentary scrap section, which shows a helical gear pump rotor into which is fitted the end of a flexible shaft, according to the present invention; and FIG. 2 is a cross section of the complete pump of Figure 1 to a smaller scale.

In the embodiment of pump illustrated in Figures 1 and 2 a helical gear pump is shown as comprising a resilient stator 10 mounted in a housing 11 and having a helically threaded bore 12, the thread having one more or one less start than that of the helically threaded rotor 13. In order to drive the rotor 13 in its rotating and orbiting path, a drive shaft 14 is secured thereto. This drive shaft comprises an elongate steel member 15 provided at each end with an enlarged end portion 16. The connection to the rotor is shown in greater detail in FIG. 1, and a similar connection is effected at the other end of the flexible drive shaft where it is connected to a key shaft 100 (FIG. 2) which may be secured to the armature shaft of an electric motor (not shown).

At its right-hand end, the rotor 13, as seen in FIG. 1, is provided with an extension 17, formed with an aperture 19 transversely aligned with a blind aperture 20 in the end portion 16.

Surrounding the shaft 15 is a coating layer 21 of a chlorinated polyether plastics material sold under the trade name "Penton." This coating can be applied by the fluidized bed technique, and is applied on that portion of the shaft 15 between the enlarged end portion 16, and the corresponding end portion at the other end of the shaft.

Two D-section keying pegs 22 and 23 are located in the apertures 19 and 20 and a shroud 24 surrounds the extension 17 and that part of the end portion 16 which is coated with the layer 21. Transversely aligned with the apertures 19 and 20 is a threaded transverse bore 26, in which is screwed a locking screw 25, having a tapered end, so that tightening of the screw forces the pegs 22 and 23 apart and into engagement with both of the apertures, to provide a keying arrangement between the shaft and rotor, which allows drive to take place in either rotational direction.

Sealing of the shroud to the rotor extension 16 and the drive shaft 14 is effected by means of toroidal sealing rings 27 and 28, and a resilient band 29 of elastomeric material encircles the shroud to protect the locking screw 25.

The provision of the sealing ring 28 in contact with the coating 21 ensures the fluid tight seal between the rotor and the shaft, and prevents any liquid or other material being pumped from attacking the threaded portion of the shaft 15. In one particular construction, the shaft 15 is approximately 60 inches long and 0.75 inches in diameter over the majority of its length. For other sizes of pumps, the proportions of the shaft will be much the same while the actual dimensions may be larger or smaller. These proportions permit the shaft to flex sufficiently to allow for the eccentricity of the rotor. It will be apparent that considerable variations in stress will occur as the shaft rotates, but the coating or layer 21 serves to prevent corrosion fatigue causing failure of the shaft 15.

The method of securing the shaft 14 at the right hand end, as indicated above, is similar. As can be seen in FIG. 2, a keyshaft 100 is bolted to a hollow shaft 101 which is mounted for rotation in the housing 102 by means of bearings 103 and 104, a seal between the shaft 101 and the housing 102 being effected by a suitable packing ring 105 located between a gland 106 and a gland ring 107. In FIG. 2 the inlet to the pump is illustrated at 108 and the outlet at 109.

We claim:
1. A rotary machine comprising, in combination:
  i. a stator;
  ii. a rotor eccentrically rotatable with respect to said stator;
  iii. means defining a recess in said rotor;
  iv. a flexible drive shaft;
  v. an end portion to said flexible drive shaft, located in said recess;
  vi. transversely aligned apertures in said end portion and said recess defining means;

vii. key means located in said apertures effective to key said drive shaft nonpivotably to said rotor, whereby said rotor may be driven by or receive drive from said drive shaft; and viii a nonpermeable and nonporous layer coating said drive shaft.

2. A rotary helical gear pump comprising, in combination:

i. a stator formed with at least one helical gear;

ii. a rotor formed with at least one helical gear, meshing with the stator gear or gears, the number of starts of the gear or gears of the stator differing by one from the number of starts of the gear or gears of the rotor;

iii. means defining a recess in said rotor;

iv. a flexible drive shaft;

v. an end portion to said flexible drive shaft, located in said recess;

vi. transversely aligned apertures in said end portion and said recess defining means;

vii. key means located in said apertures effective to key said drive shaft nonpivotally to said rotor, whereby said rotor may be driven by or receive drive from said drive shaft; and viii. a nonpermeable and nonporous layer coating said drive shaft.

3. A helical gear pump as claimed in claim 2, wherein said recess defining means comprise an extension to said rotor.

4. A helical gear pump as claimed in claim 3, and further comprising a shroud surrounding said extension, a threaded bore transversely aligned with said apertures, and a locking screw threadably engaged in said transverse bore.

5. A helical gear pump as claimed in claim 4, wherein said key means comprises a pair of D-section pegs and wherein said locking screw locates between said pegs effective to force them apart into engagement with both of said transversely aligned apertures.

6. A helical gear pump as claimed in claim 4, and further comprising a first sealing ring located between said shroud and said extension and a second sealing ring located between said shroud and said end portion.

7. A helical gear pump as claimed in claim 4, and further comprising a resilient band encircling said shroud and covering said threaded bore thereon.

8. A helical gear pump as claimed in claim 2, wherein said coating is formed of chlorinated polyether, nitral rubber or of an epoxy resin.